US012562981B2

(12) United States Patent
Alim et al.

(10) Patent No.: US 12,562,981 B2
(45) Date of Patent: Feb. 24, 2026

(54) COORDINATING SELECTION OF A PATH BETWEEN A SOURCE NODE AND A DESTINATION NODE IN A NETWORK

(71) Applicant: INTERNATIONAL BUSINESS MACHINES CORPORATION, Armonk, NY (US)

(72) Inventors: Md Abdul Alim, White Plains, NY (US); Ali Sydney, Pepperell, MA (US); Bengi Karacali-Akyamac, Somerset, NJ (US)

(73) Assignee: International Business Machines Corporation, Armonk, NY (US)

( * ) Notice: Subject to any disclaimer, the term of this patent is extended or adjusted under 35 U.S.C. 154(b) by 427 days.

(21) Appl. No.: 18/191,853

(22) Filed: Mar. 28, 2023

(65) Prior Publication Data

US 2024/0333636 A1     Oct. 3, 2024

(51) Int. Cl.
*H04L 45/00* (2022.01)
*H04L 45/24* (2022.01)
*H04L 45/64* (2022.01)

(52) U.S. Cl.
CPC .............. *H04L 45/34* (2013.01); *H04L 45/24* (2013.01); *H04L 45/64* (2013.01)

(58) Field of Classification Search
CPC .......... H04L 45/24; H04L 45/34; H04L 45/64
See application file for complete search history.

(56) References Cited

U.S. PATENT DOCUMENTS

| | | | |
|---|---|---|---|
| 11,444,855 B2 | 9/2022 | Naik et al. | |
| 2017/0187629 A1* | 6/2017 | Shalev | H04L 45/72 |
| 2019/0245915 A1* | 8/2019 | Kommula | H04L 43/0882 |
| 2020/0196219 A1* | 6/2020 | Hashemi | H04W 40/28 |
| 2021/0176347 A1* | 6/2021 | Goel | H04L 47/15 |
| 2021/0320820 A1* | 10/2021 | Ruan | H04L 43/0876 |

(Continued)

OTHER PUBLICATIONS

D.D. Sensi et al., "An In-Depth Analysis of the Slingshot Interconnect.", ACM/IEEE SC'20: International Conference for High Performance Computing, Networking, Storage and Analysis., Nov. 2020, Article No. 35, pp. 1-13.

(Continued)

*Primary Examiner* — Donald L Mills
(74) *Attorney, Agent, or Firm* — Konrad, Raynes, Davda & Victor LLP; David Victor

(57) ABSTRACT

Provided are a computer program product, system, and method for coordinating selection of a path between a source node and a destination node in a network. The source node selects a first path to a destination node based on source switch port utilization information for ports in a local source switch. The source node transmits a path setup message to the destination node over the selected first path. The destination node determines a second path from the source node to the destination node including a selected local source switch port and a local destination switch port based on utilization information in the path setup message and destination switch port utilization information. The destination node transmits to the source node a reply to the path setup message indicating the second path. The source node uses the second path indicated in the reply to communicate with the destination node.

20 Claims, 7 Drawing Sheets

(56)                References Cited

U.S. PATENT DOCUMENTS

2022/0075673 A1     3/2022  Malhotra et al.

OTHER PUBLICATIONS

A. Kumar et al., "BwE: Flexible, Hierarchical Bandwidth Allocation for WAN Distributed Computing.", ACM SIGCOMM 2015, Aug. 2015, 14 pp.
Y. Zhu et al., "Congestion Control for Large-Scale RDMA Deployments.", ACM SIGCOMM 2015. Aug. 2015, 14 pp.
M. Suchara, et al., "Network Architecture for Joint Failure Recovery and Traffic Engineering.", ACM SIGMETRICS 2011, Jun. 7-11, 2011, 13 pp.
Advanced Computing as a Science & Profession, ACM, SIGCOMM '19, Proceedings of the 2019 Conference of the ACM Special Interest Group on Data Communication, 2019, 12 pp.
Proceedings of NSDI '11: 8th USENIX Symposium on Networked Systems Design and Implementation, Mar. 30-Apr. 1, 2011, 338 pp. [Uploaded in 4 parts].
"Cooperating Overlay and Underlay Controllers for Cloud Network Traffic Engineering," IP.com No. IPCOM000270551D, Jul. 14, 2022, 8 pages.
P. Aukia, et al. "RATES: A Server for MPLS Traffic Engineering.", IEEE Network Magazine 14, 2 (Mar. 2000), 8 pp.
D. Awduche, et al., "Requirements for Traffic Engineering Over MPLS.", RFC 2702, IETF, 1999, 29 pp.
M. Alizadeh et al., "CONGA: Distributed Congestion-Aware Load Balancing for Datacentrers.", ACM SIGCOMM 2014, Aug. 2014, 12 pp.
B. Fortz, et al., "Traffic Engineering with Traditional IP Routing protocols.", IEEE Communications Magazine 40 (2002), 7 pp.
D. Awduche, et al., "RSVP-TE: Extensions to RSVP for LSP Tunnels.", RFC 3209, IETF, 2001, 61 pp.
Y. Li, et al., "HPCC: High Precision Congestion Control", ACM, SIGCOMM '19, Aug. 2019, 15 pp.
R.B. Basat et al., "PINT: Probabilistic In-band Network Telemetry.", ACM SIGCOMM '20, Aug. 2020, 19 pp.
A. Shieh, et al., "Sharing the data center network," in 8th USENIX Symposium on Networked Systems Design and Implementation (NSDI 11), 2011. Mar. 30-Apr. 1, 2011, 14 pp.
S. Jain, et al., "B4: Experience with a Globally-deployed Software Defined WAN.", In Proc. Of ACM SIGCOMM 2013, Aug. 12-16, 2013, 12 pp.
X. Zhang et al., "CaRA: Congestion-aware Routing Algorithm for Data Center Network.", JIMET'15, Atlantis Press (Springer Nature), Dec. 18-20, 2015, 4 pp.
S. Ghorbani et al., "DRILL: Micro Load Balancing for Low-latency Data Center Networks.", ACM SIGCOMM 2017. Aug. 21-25, 2017, 14 pp.
C. Guo et al., "RDMA over Commodity Ethernet at Scale.", ACM SIGCOMM 2016. Aug. 22-26, 2016, 14 pp.

M. Handley et al., "Re-architecting datacenter networks and stacks for low latency and high performance.", ACM SIGCOMM 2017. Aug. 21-25, 2017, 14 pp.
M. Besta et. al., "FatPaths: Routing in Supercomputers and Data Centers when Shortest Paths Fall Short.", ACM/IEEE SC'20: International Conference for High Performance Computing, Networking, Storage and Analysis., Nov. 2020, Article No. 35, 34 pp.
M. Al-Fares et.al., "Hedera: Dynamic Flow Scheduling for Data Center Networks.", 7th USENIX Symposium of NSDI, Apr. 28-30, 2010, 15 pp.
Z. Liu et al., "NetVision: Towards Network Telemetry as a Service." IEEE ICNP 2018. Sep. 24-27, 2018, 2 pp.
M. Yu, "Network Telemetry: Towards A Top-Down Approach.", ACM SIGCOMM Computer Communication Review. vol. 49, Issue 1, Jan. 2019, 7 pp.
S. A. Smith et al., "Mitigating Inter-Job Interference Using Adaptive Flow-Aware Routing.", ACM SC'18. Nov. 11-16, 2018, 15 pp.
S. Sinha et al., "Harnessing TCP's Burstiness with Flowlet Switching.", ACM SIGCOMM Workshop on HotNets III. Nov. 15-16, 2004, 6 pp.
N. Taherkhani et al., "A congestion-aware routing algorithm for mesh-based platform networks-on-chip.", Microelectronics Journal. 114 (2021) 105145. Jun. 24, 2021, 14 pp.
P. Sindu, "TrueFabric: A Fundamental Advance to the State of the Art in Data Center Networks." Fungible, Whitepaper, 2020, 6 pp.
D. Tang et al., "Congestion-Aware Routing Scheme based on Traffic Information in Sensor Networks." Security and Communication Networks, John Wiley & Sons, Ltd., 2017, 9 pp.
Y. Zhu et al., "Packet-Level Telemetry in Large Datacenter Networks." ACM SIGCOMM 2015. Aug. 17-21, 2015, 13 pp.
L. Tan et. al., "In-band Network Telemetry: A survey." Computer Networks 186 (2021) 107763. Elsevier Ltd, Dec. 22, 2020, 20 pp.
M.U. Ghazi et al., "Congestion-Aware Routing Algorithm Based on Traffic Priority in Wireless Sensor Networks." IEEE 15th International Conference on Smart Cities: Improving Quality of Life Using ICT & IoT. Oct. 8-10, 2018, 5 pp.
T. Pan et al., "INT-path: Towards Optimal Path Planning for In-band Network-Wide Telemetry." IEEE INFOCOM 2019. Apr. 29-May 2, 2019, 9 pp.
B. Claise et al., "Specification of the IP Flow Information Export (IPFIX) Protocol for the Exchange of Flow Information." RFC 7011, Sep. 2013. IETF, 76 pp.
P. Bosshart et al., "P4: Programming Protocol-independent Packet Processors." ACM SIGCOMM Computer Communication Review 44-3. Jul. 2014. 9 pp.
"InfiniBand Architecture General Specifications," Infiniband Trade Association, Release 1.2.1, Nov. 2007, 1727 pp.
M. Alizadeh et al., "Data Center TCP (DCTCP)." ACM SIGCOMM 2010. Aug. 30-Sep. 3, 2010, 12 pp.
"InfiniBand Architecture Specification Release 1.2.1 Annex A17: RoCEv2." Infiniband Trade Association, Sep. 2, 2014, 23 pp.
C. Paasch et al., "Multipath TCP (MPTCP)." Communications of the ACM. vol. 57, No. 4, Apr. 2014, 7 pp.

* cited by examiner

Switch Port Utilization Information

Path Setup Message

Reply to Path Setup Message

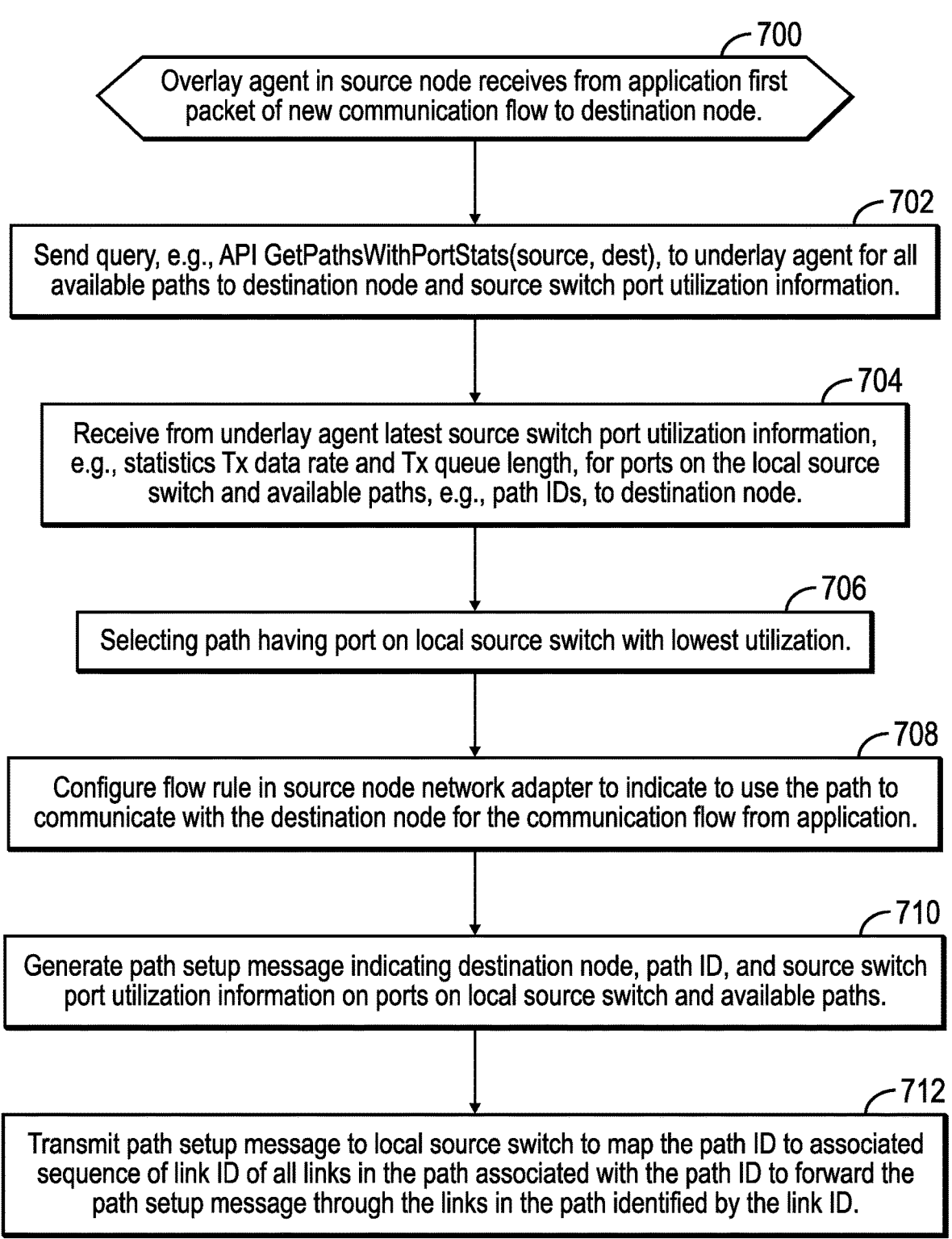

700
Overlay agent in source node receives from application first packet of new communication flow to destination node.

702
Send query, e.g., API GetPathsWithPortStats(source, dest), to underlay agent for all available paths to destination node and source switch port utilization information.

704
Receive from underlay agent latest source switch port utilization information, e.g., statistics Tx data rate and Tx queue length, for ports on the local source switch and available paths, e.g., path IDs, to destination node.

706
Selecting path having port on local source switch with lowest utilization.

708
Configure flow rule in source node network adapter to indicate to use the path to communicate with the destination node for the communication flow from application.

710
Generate path setup message indicating destination node, path ID, and source switch port utilization information on ports on local source switch and available paths.

712
Transmit path setup message to local source switch to map the path ID to associated sequence of link ID of all links in the path associated with the path ID to forward the path setup message through the links in the path identified by the link ID.

FIG. 7

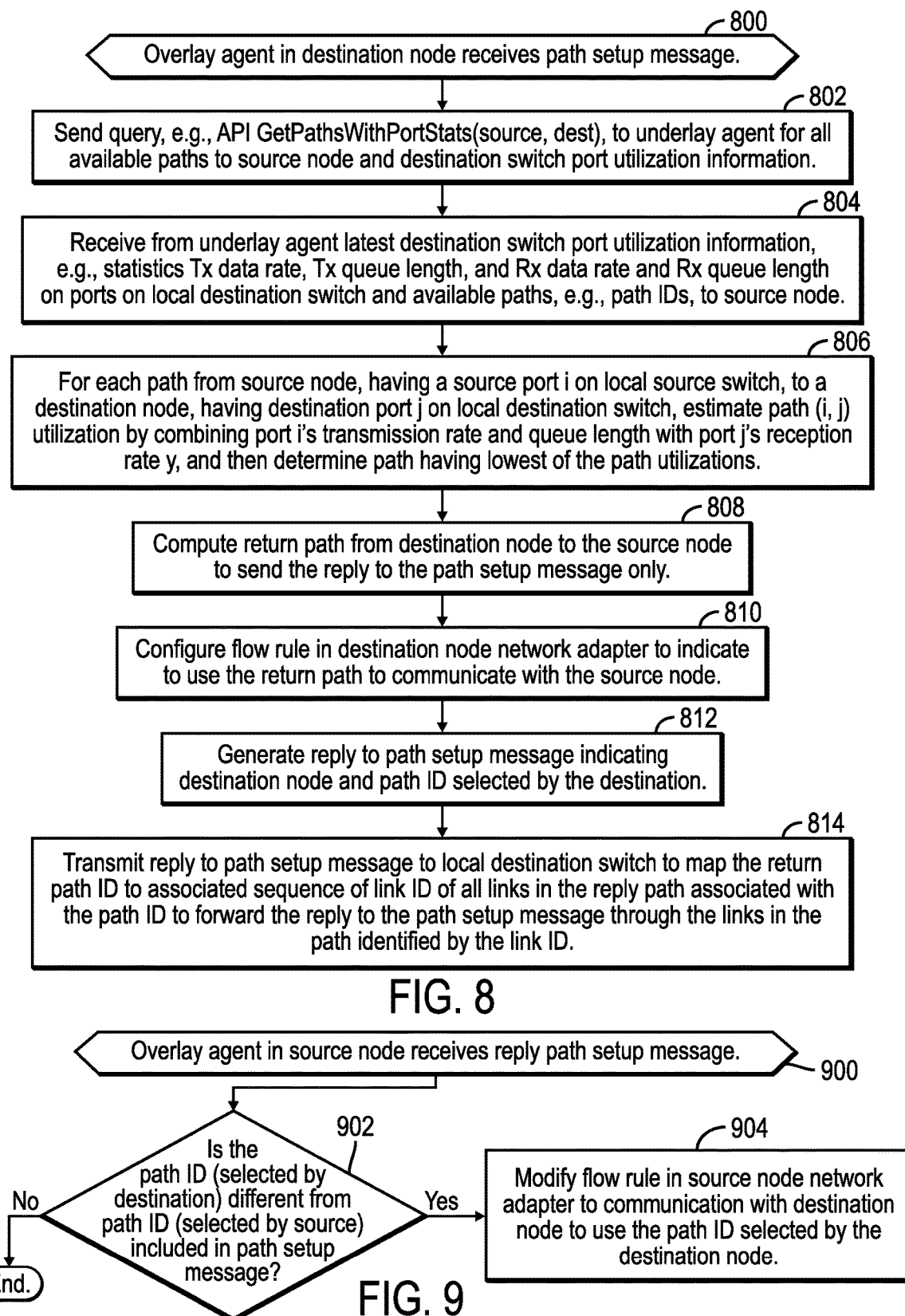

800

Overlay agent in destination node receives path setup message.

802

Send query, e.g., API GetPathsWithPortStats(source, dest), to underlay agent for all available paths to source node and destination switch port utilization information.

804

Receive from underlay agent latest destination switch port utilization information, e.g., statistics Tx data rate, Tx queue length, and Rx data rate and Rx queue length on ports on local destination switch and available paths, e.g., path IDs, to source node.

806

For each path from source node, having a source port i on local source switch, to a destination node, having destination port j on local destination switch, estimate path (i, j) utilization by combining port i's transmission rate and queue length with port j's reception rate y, and then determine path having lowest of the path utilizations.

808

Compute return path from destination node to the source node to send the reply to the path setup message only.

810

Configure flow rule in destination node network adapter to indicate to use the return path to communicate with the source node.

812

Generate reply to path setup message indicating destination node and path ID selected by the destination.

814

Transmit reply to path setup message to local destination switch to map the return path ID to associated sequence of link ID of all links in the reply path associated with the path ID to forward the reply to the path setup message through the links in the path identified by the link ID.

FIG. 8

Overlay agent in source node receives reply path setup message.

900

902

Is the path ID (selected by destination) different from path ID (selected by source) included in path setup message?

No → End.

Yes

904

Modify flow rule in source node network adapter to communication with destination node to use the path ID selected by the destination node.

FIG. 9

1200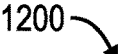

Computer 1201

Processor Set 1210

Processing Circuitry 1220          Cache 1221

Communication Fabric 1211

Volatile Memory 1212

Persistent Storage 1213

Operating System 1222          Underlay Agent 302

Overlay Agent 308

Peripheral Device Set 1214

UI Device Set 1223     Storage 1224     IoT Sensor Set 1225

Network Module 1215

WAN 1202

End User Device 1203

Remote Server 1204

Remote Database 1230

Private Cloud 1206

Gateway 1240

Public Cloud 1205

Cloud Orchestration Module 1241     Host Physical Machine Set 1242

Virtual Machine Set 1243     Container Set 1244

FIG. 12

COORDINATING SELECTION OF A PATH BETWEEN A SOURCE NODE AND A DESTINATION NODE IN A NETWORK

BACKGROUND OF THE INVENTION

1. Field of the Invention

The present invention relates to a computer program product, system, and method for coordinating selection of a path between a source node and a destination node in a network.

2. Description of the Related Art

Modern data center networks are commonly deployed using a two-stage Clos topology and are referred to as Leaf/Spine fabrics. Servers on a rack are attached to one or more Top-of-the-Rack (ToR) switches (a.k.a. leaf switches), and each ToR switch is connected to all core switches (a.k.a. spine switches). This topology provides many parallel equal-cost paths between servers across racks. Distributed routing protocols, such as Border Gateway Protocol (BGP), are commonly used in the fabric to compute Equal-Cost Multi-Path (ECMP) routes to forward traffic through the fabric. ECMP hashes on the five tuples of a flow (using source and destination IP addresses, source and destination ports, and protocol ID) to select a path at every hop. This can result in hash collisions, where multiple flows are forwarded through the same path despite having multiple paths. Further, the network performance can be severely degraded due to resulting congestion, while other paths remain underutilized. Network congestion is a key challenge to high-performance distributed computing systems. Different proposals to address the network congestion issue include new network design, P4 programmable switches/NICs, and new transport protocols. Certain of these proposals require centralized network monitoring which is not scalable. Designing new network or implementing new transport protocols are expensive and time consuming.

Network virtualization solutions for public/private clouds typically deploy overlay networks over existing physical network infrastructure. Overlay controllers manage the life cycle of networking on the host/server for virtual entities such as virtual machines and/or containers. Traffic of such virtual entities may be encapsulated and routed through the physical network. This physical network infrastructure that provides connectivity for encapsulated traffic is referred to as the underlay. The overlay controller assumes that the underlay controller would use the best possible routes through the fabric to ensure the Quality of Service (QoS) requirements of the overlay network. In practice the underlay typically has no notion of the overlay networks and simply delivers encapsulated overlay packets to their destinations by using available Equal-Cost Multipath (ECMP) routing. The path taken by flows in such underlays is decided based on hashing in real-time among several alternate paths. Furthermore, there are multiple hashing points within the underlay making it difficult to determine or control the end-to-end path (VM/container to VM/container path) in the Point of Delivery (PoD), which often results in uneven usage of ECMP paths and congestions.

There is a need in the art for improved techniques to select a communication path between a source node and a destination node in a network.

SUMMARY

Provided are a computer program product, system, and method for coordinating selection of a path between a source node and a destination node in a network. The source node selects a first path to a destination node based on source switch port utilization information for ports in a local source switch to which the source node connects. The source node transmits a path setup message to the destination node over the selected first path indicating the selected first path and source switch port utilization information. The destination node determines a second path from the source node to the destination node including a selected local source switch port and a local destination switch port based on the source switch port utilization information in the path setup message and destination switch port utilization information of ports in a local destination switch to which the destination node connects. The destination node transmits to the source node a reply to the path setup message indicating the second path, including the selected local source switch port and the local destination switch port of the second path. The source node uses the second path indicated in the reply to the path setup message to communicate with the destination node.

BRIEF DESCRIPTION OF THE DRAWINGS

FIG. 7 illustrates an embodiment of operations of the source node to select a path to the destination node.

FIG. 8 illustrates an embodiment of operations of the destination node to select a return path to the source node.

FIG. 9 illustrates an embodiment of operations of the source node to select one of the paths the source node selected or one of the paths the destination node selected to establish a communication path from the source node to the destination node.

FIG. 12 illustrates a computing environment in which the components of FIGS. 1, 2, and 3 may be implemented.

DETAILED DESCRIPTION

Described embodiments provide improvements to computer technology for selecting paths to use between a source node and a destination node in a network. With described embodiments, the source node communicates source switch port utilization statistics for ports on a local source switch, to which the source node connects, to a destination node. The destination node processes the received source switch port utilization statistics and destination switch port utilization statistics for switch ports on a local destination switch, to which the destination node connects, to select a least utilized end-to-end path based on utilization statistics for the local source switch ports and the local destination switch ports.

The described embodiments provide fine-grained path control over end-to-end paths by using source routing and avoids network congestion by scheduling flows to the least-utilized paths. Described embodiments are lightweight and scalable as they monitor only local leaf switch ports using a distributed underlay controller agent running on each node to estimate end-to-end path utilization. Certain embodiments are agnostic to fabric switch technologies and do not require any changes to switches or network interface controllers (NICs) or path monitoring. Described embodiments may eliminate hash collisions by using source routing and minimizes network congestion by scheduling flows to least-utilized paths.

Described embodiments may further minimize fabric monitoring overheads by using a distributed underlay controller agent on each node to collect port statistics periodically from local leaf switch(s) only. Further, described embodiments may be deployed in leaf/spine fabrics at scale as the centralized network manager does not need to program flow rules on the switches/hosts or keep track of any of the flows in the fabric. Yet further, described embodiments may be orthogonal to congestion control protocols, such as high precision congestion control (HPCC), Data Center Quantized Congestion Notification (DCQCN), and/or Data Center Transmission Control Protocol (DCTCP), and, thus, can be deployed along with these congestion control protocols to further enhance the overall network utilization/performance.

Figure 1:
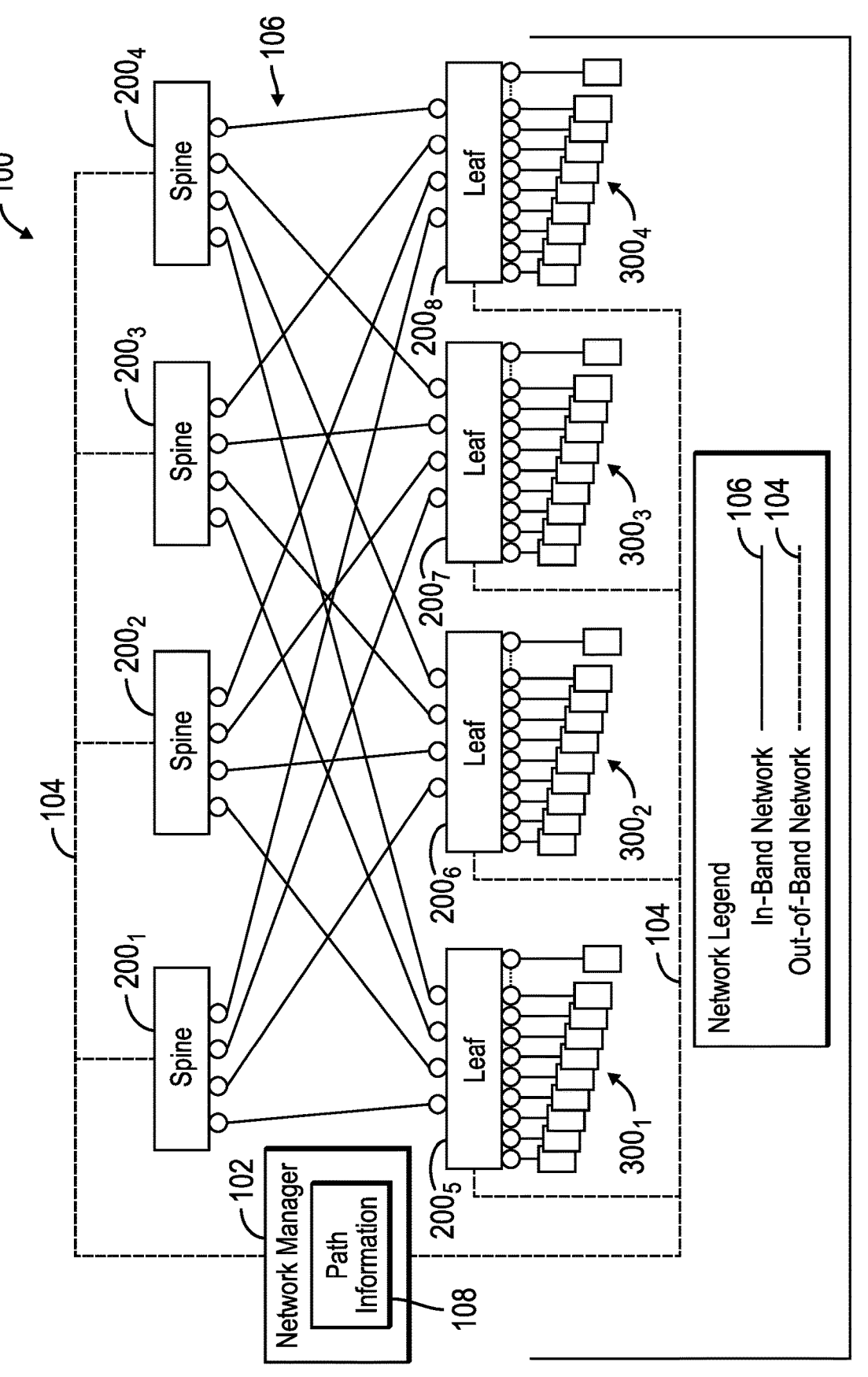
FIG. 1 illustrates an embodiment of a network computing environment.

FIG. 1 illustrates an embodiment of a network computing environment 100 including a network manager 102 that upon initialization determines the topology of all switches $200_1$, $200_2$ ... $200_8$ and computational nodes $300_1$ ... $300_4$ in the network 100 by communicating with the switches $200_1$, $200_2$ ... $200_8$ over an out-of-band network 104. The network manager 102 may connect to the switches $200_1$ ... $200_8$ and nodes $300_1$ ... $300_4$ via an in-band network 106 to configure source routing paths in the switches $200_1$ ... $200_8$. Alternatively, the network manager 102 may connect to other components using the in-band network 106.

The network manager 102 may assign a unique path identifier (ID) to each disjoint path in the network 100. In certain embodiments, the path ID may comprise a source routing (SR) path ID (e.g., segment routing SID), where the intended path is specified in a packet header. Each of the sets of nodes $300_1$ ... $300_4$ connect to one port on one or more leaf switches $200_5$ ... $200_8$. The leaf switches $200_5$ ... $200_8$ may comprise local switches to connect nodes $300_1$ ... $300_8$, such as servers, storage servers, or other computational devices, to the network 100. For instance, the leaf switches $200_5$ ... $200_8$ may comprise top-of-rack switches in racks in a data center 100 and each set of nodes $300_i$ in a rack connects to one or more leaf switches $200_5$ ... $200_8$. Each of the leaf switches $200_5$ ... $200_8$ connects to spine switches $200_1$ ... $200_4$ to interconnect the leaf switches $200_5$ ... $200_8$ and all the nodes $300_1$ ... $300_4$ connected to the leaf switches $200_5$ ... $200_8$. The network manager 102 stores topology of all switches and nodes in the network 100, computes SR paths from each node $200i$ to all other nodes $200j$ and $300k$ and stores them in path information 108, which may be distributed to the switches $200_1$ ... $200_8$.

Although a certain number of switches and nodes are shown in FIG. 1, implementations of networks may include any number of nodes and switches, and intermediary levels of switches connecting other switches.

Each switch $200_i$ in the network 100 includes: path information 202, e.g., source routing (SR) paths, communicated by the network manager 102 during initialization, that provides the interconnection of all switches $200_1$ ... $200_8$, nodes $300_1$ ... $300_4$, and links; a path ID mapping 204 that maps a unique path ID to a sequence of links between switches and nodes in the path; and switch port utilization information 400 having statistics on utilization of each of the ports on the switch $200_i$, which may include, for each port, a transmission (Tx) and reception (Rx) data rate and a transmission (Tx) queue length and a reception (Rx) queue length.

Each node $300_i$ in the network 100 includes an underlay agent 302 that communicates with a local switch $200_i$ to obtain path IDs 304 to a destination node $300_D$ with which node $300_i$ wants to communicate in the network 100 and to obtain port utilization information 400 on ports on the local switch $200_1$ that connect the node $300_1$ to the network 100. The utilization information 4001 may include, for each local switch port, a transmission (Tx) and reception (Rx) data rate and a transmission (Tx) queue length and a reception (Rx) queue length; an overlay agent 308 to receive packets from a user workload 310, such as an application executing in the node $300_1$, to send to a destination node $300_D$; and one or more network adapters 312, such as a network interface card (NIC), to connect to one or more local leaf switches $200_5$ ... $200_8$.

In certain embodiments, the network manager 102 may comprise a Software Defined Network (SDN) underlay controller that manages the underlay network elements (e.g. spine/leaf switches) that are capable of injecting and processing SR paths (e.g. Multiprotocol Label Switching (MPLS) label stacks). The overlay agent 308 may comprise an SDN overlay controller that manages virtual entities (e.g. overlay controller agent running on the host/SmartNICs for setting up overlay tunnels and is capable of installing flow rules for SR paths. The underlay agent 302 may comprise an underlay controller agent that collects switch port statistics periodically from the leaf switch(s) that are attached to the node $300_i$ and is able to associate leaf switch port statistics to paths to other hosts. Furthermore, the installation of a flow rule (e.g. TC Flower rule) in the network adapter 312 of a node $300_i$ causes the network adapter 312 to push the path ID, such as an SR path ID, that represents the selected path, into the header of the packet of the flow.

In described embodiments, source routing, such as Segment Routing or MPLS, may be used for end-to-end path control.

Figures 2, 3, 4, 5, 6:
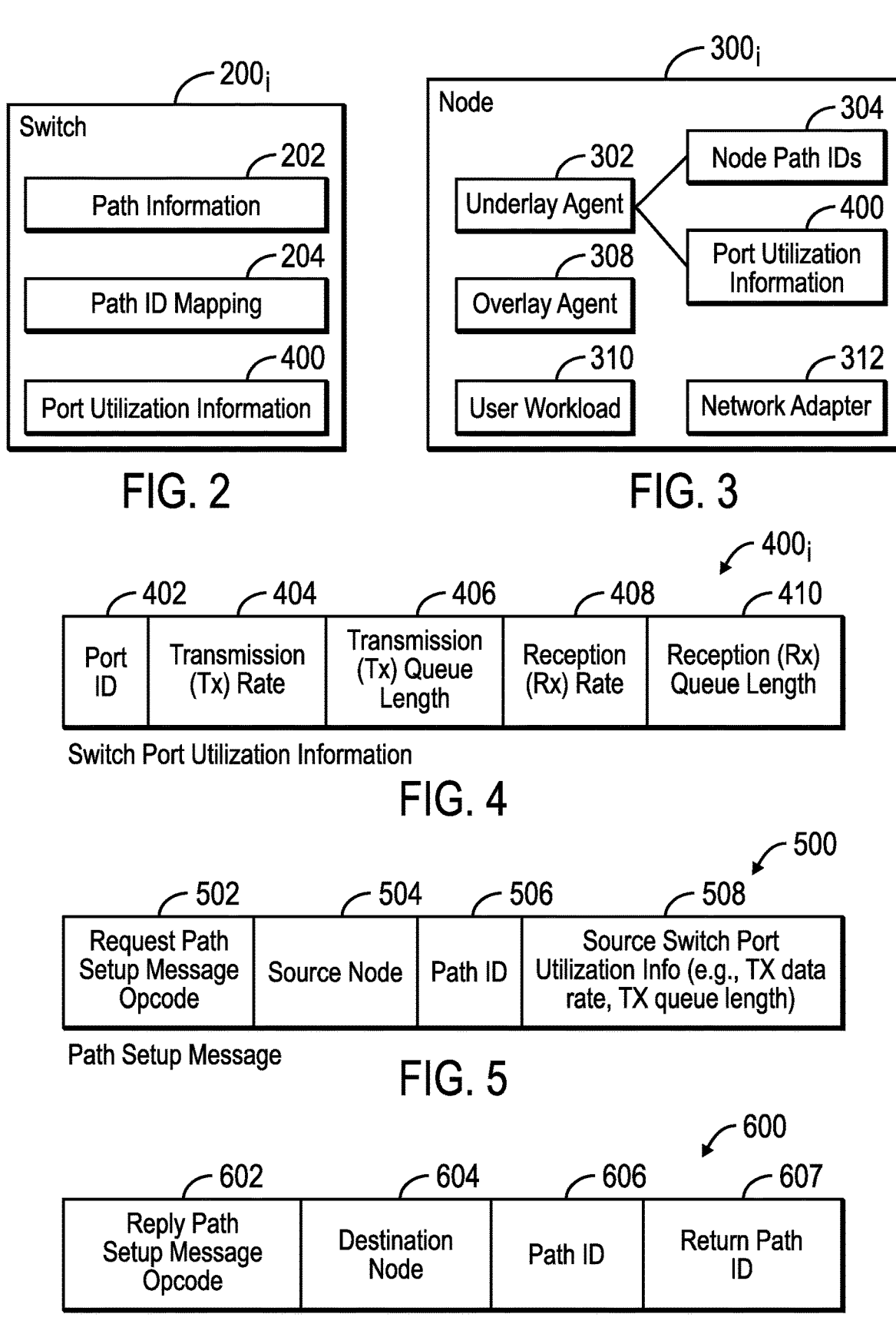
FIG. 2 illustrates an embodiment of a switch in the network.
FIG. 3 illustrates an embodiment of a node in the network.
FIG. 4 illustrates an embodiment of switch port utilization information for ports on local switches to which nodes connect.
FIG. 5 illustrates an embodiment of a path setup message a source node sends to a destination node to establish a communication path.
FIG. 6 illustrates an embodiment of a reply to path setup message a destination node sends to the source node in reply to the path setup message to establish a communication path.

The program components of FIGS. 1, 2, and 3, including program components 302 and 308 may comprise program code loaded into a memory and executed by one or more processors. Alternatively, some or all of the functions may be implemented as microcode or firmware in hardware devices, such as in Application Specific Integrated Circuits (ASICs).

The networks 104 and 106 may comprise a Storage Area Network (SAN), a Local Area Network (LAN), a Wide Area Network (WAN), Clos network, the Internet, and Intranet, peer-to-peer network, direct communication paths, etc.

FIG. 4 illustrates an embodiment of an instance $400_i$ of switch port utilization information 400, and may include: a port identifier (ID) 402, comprising a unique identifier of a port on a local switch $200_i$ connected to a node $300_i$; a transmission (Tx) rate 404 of data through the port 402 and a transmission (Tx) queue length 406 of a number of entries in a transmission queue for port 402; a reception (Rx) rate

408 of data through the port 402 and a reception (Rx) queue length 408 of a number of entries in a reception queue for port 402.

Any node 300$_i$ may function as a source node and a destination node with respect to other nodes in the network.

In certain embodiments, the underlay agent 302 on a node 300$_i$ may periodically communicate with the connected local switch 200$_i$ to obtain the switch port utilization information 400 for all ports on the local switch 200$_i$ that connect to the spine switches 200$_1$ . . . 200$_4$.

FIG. 5 illustrates an embodiment of a path setup message 500 sent by a source node 300$_S$ to communicate with a destination node 300$_D$ to establish a path having ports. The path may be selected having ports on the local source node switch 200$_S$ and destination node switch 200$_D$, to which the nodes 300$_S$ and 300$_D$ connect on their local switches, that have the least utilization. The path set up message 500 includes: a request path setup message opcode 502; a source node 504 initiating the communication; a path ID 506 the source node 300$_S$ selects to use as the communication path; and source switch port utilization information 508 having utilization information (e.g., Tx data rate 404 and Tx queue length 406) on ports on the local switch 200$_S$, to which the source node 300$_S$ connects, providing paths to the destination node 200$_D$.

FIG. 6 illustrates an embodiment of a reply to the path setup message 600 sent by the destination node 300$_D$ back to the source node 300$_S$ that sent the path setup message 500, and includes: a reply path setup message opcode 602; the destination node 604 sending the reply 600; a path ID 606 the destination node 604 determined as a least utilized path having the lowest utilization based on the source switch port utilization information 400$_S$ of switch ports on a local source switch 200$_S$, which were included in the source switch port utilization info 508 in the path setup message 500, and the destination switch port utilization information 400$_D$ of switch ports on a local destination switch 200$_D$ to which the destination node 300$_D$ connects; and a return path ID 607 used to send the reply message only, which carries the best path ID 606 computed by the destination, which represents a path from the source to the destination.

FIG. 7 illustrates an embodiment of operations performed by a source node 300$_S$ to establish communication with a destination node 300$_D$ over the network 100. Upon a source overlay agent 308$_S$ at the source node 300$_S$ receiving from an application user workload 310 a first packet of a new communication flow to the destination node 300$_D$, the source overlay agent 308$_S$ sends (at block 702) a query to the source underlay agent 302$_S$ for all available paths IDs 304 to the destination node 300$_D$ and source switch port utilization information 400$_S$. The command may comprise an application programming interface (API), such as GetPathsWithPortStats (source, dest). The source overlay agent 308$_S$ receives (at block 704), from the source underlay agent 302$_S$, the latest source switch port utilization information 400$_S$, e.g., Tx data rate, Tx queue length, and Rx data rate on the local source node switch 200$_S$ and available paths 304, e.g., path IDs, to the destination node 300$_D$. The source overlay agent 308$_S$ selects (at block 706) a path to the destination node 300$_D$ having a port on the local source switch 200$_S$ with a lowest utilization. For instance, the local source switch 200$_S$ port may be selected based on a port having a lowest transmission rate or a smallest transmission queue depth, or some consideration based on a combination of both the transmission statistics, and/or other statistics.

The source overlay agent 308$_S$ configures (at block 708) a flow rule in the source node 300$_S$ network adapter 312$_S$ to indicate to use the path ID to communicate with the destination node 300$_D$ for the communication flow from application 310. The source node 300$_S$ generates (at block 710) a path setup message 500 indicating the source node 300$_S$ in field 504; the path ID 506 as the selected path ID using the switch port with the least utilization; and source switch port utilization information 508 having the port utilization information 400$_S$ for the switch ports on the local source switch 200$_S$. The source overlay agent 308$_S$ transmits (at block 712) the path setup message 500 to the local source node switch 200$_S$. The local source switch 200$_S$ uses the path ID mapping 204 to map the path ID 506 to the associated sequence of link IDs, of all links in the selected path associated with the path ID 506, to forward the path setup message 500 through the links in the path identified by the link IDs associated with the path ID 508.

FIG. 8 illustrates an embodiment of operations performed by a destination node 300$_D$ to coordinate with the source node 300$_S$ to select a least utilized communication path from the source node 300$_S$ to the destination node 300$_D$. Upon the destination overlay agent 308$_D$ in the destination node 300$_D$ receiving (at block 800) the path setup message 500 from the source node 300$_S$, the destination overlay agent 308$_D$ sends (at block 802) a query to the destination underlay agent 302$_D$ for all available paths IDs 304 from the source node 300$_S$ to the destination node 300$_D$ and destination switch port utilization information 400$_D$. The command may comprise the application programming interface (API), such as Get-PathsWithPortStats (source, dest). The destination overlay agent 308$_D$ receives (at block 804), from the destination underlay agent 302$_D$, the latest destination switch port utilization information 400$_D$, e.g., statistics of Tx data rate, Tx queue length, Rx data rate on the local destination switch 200$_D$ and available paths 304, e.g., path IDs, to the source node 300$_S$.

The destination overlay agent 308$_D$ selects (at block 806) a path from the source node 300$_S$ to the destination node 300$_D$ by first estimating, for each path (i, j) from the source node 300$_S$, having a source port i on the local source switch 200$_S$, to the destination port j, on the local destination switch 200$_D$, a path utilization for path (i, j) by combining port i's transmission rate 404, transmission queue length 406, and port j's reception rate 408. In certain embodiments, the spine switch ports are not monitored and the reception Rx rate 408 at the destination port is used to estimate the link utilization of the link from the spine to the leaf switch. The reception Rx rate 408 at the destination port provides an adequate estimation of the link utilization. If the reception Rx rate 408 is high (i.e. close to the link bandwidth), the link can be considered congested. Second, the destination overlay agent 308$_D$, selects the best path 606 having the minimum estimated path utilization of the paths (i, j). The destination overlay agent 308$_D$ also computes (at block 808) the return path (ID 607) from the destination node 300$_D$ to the source node 300$_S$ to send path setup message reply. The return path 607 is used to send the reply message only. The reply message 600 carries the best path ID 606 computed by the destination, which represents a path from the source to the destination.

The destination overlay agent 308$_D$ configures (at block 810) a flow rule in the destination node 300$_D$ network adapter 312 to indicate to use the reply path ID to communicate with the source node 300$_S$ for the communication. The destination overlay agent 308$_D$ generates (at block 812) a reply to the path setup message 600 indicating the destination node 300$_D$ in field 604 and the best path ID 606. The destination overlay agent 308$_D$ transmits (at block 814) the reply to path setup message 600 on the return path 607 to the local destination node switch 200$_D$ to use the path ID mapping 204 to map the return path ID 607 to the associated sequence of link IDs of all links in the selected return path to send the reply 600 through the links in the path identified by the link IDs associated with the path ID 607.

FIG. 9 illustrates an embodiment of operations performed at the source overlay agent 308$_S$ in the source node 300$_S$ to select the best path from the path 506 the source node selected or the path 606 selected by the destination node 300$_D$. Upon the source overlay agent 308$_S$ in the source node 300$_S$ receiving (at block 900) the reply to the path setup message 600, if (at block 902) the best path ID 606 in the reply 600 is different from the path ID the source node previously used to send the path setup message 500, then the source overlay agent 308$_S$ modifies (at block 904) the flow rule in the source node network adapter 312 for the destination node 300$_D$ to use the path ID 606 in the reply 600, selected by the destination node 300$_D$, to communicate with the destination node 300$_D$.

With the embodiment of FIGS. 7, 8, and 9, the source node, when initiating communication with the destination node, coordinates with the destination node to select the least utilized path by selecting a path through a port on the local source switch that has the least utilization to use to start communication with the destination node. The destination node uses the source switch port utilization information sent by the source node and the destination switch port utilization determined from the local destination switch to select a path using ports on the local destination switch and the local source switch that provides a least utilization according to a selection criteria. In this way, the consideration of the least utilized path uses current port statistics from the local source switch and the local destination switch with a minimum number of communications between the source node 300$_S$ and the destination node 300$_D$ to provide an efficient technique for selecting a least utilized path between a source node and destination node.

Figure 10:
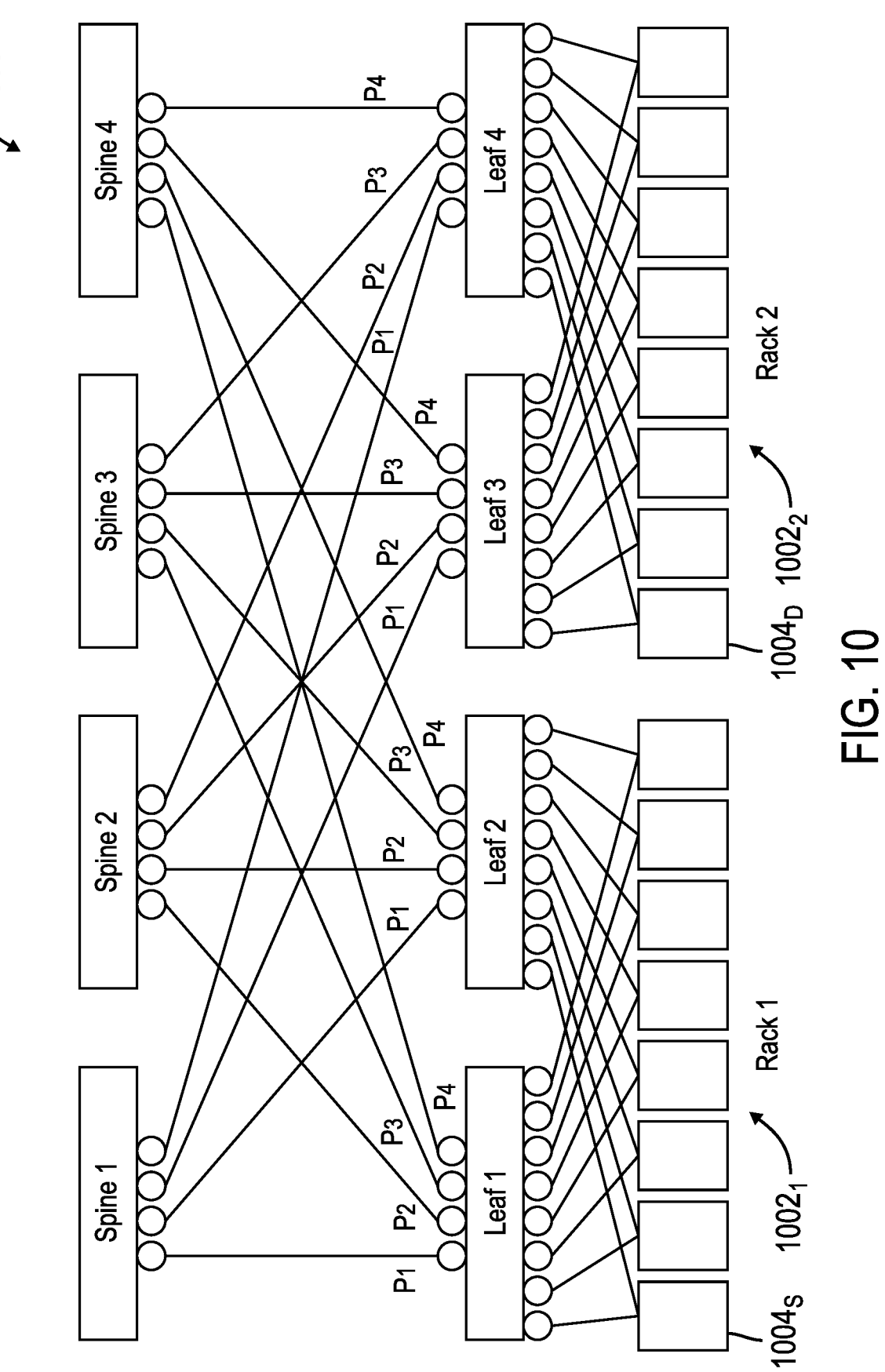
FIG. 10 illustrates an embodiment of a network with dual-homed servers in which described embodiments may be implemented.

FIG. 10 illustrates an embodiment of a network 1000 with dual-homed sets of servers 1002$_1$ and 1002$_2$ on rack 1 and rack 2, respectively. Each server in the sets of servers 1002$_1$ and 1002$_2$ connects to two different leaf (local) switches to provide redundant paths so that failure on one path to a server does not result in loss of connectivity. Servers 10001 on rack 1 are connected to both leaf 1 and leaf 2 switches and servers 1000$_2$ on rack 2 are connected to both leaf 3 and leaf 4 switches. With dual homing, there are sixteen paths in the fabric from each server 10001 on rack 1 via leaf 1 and leaf 2 to each server 1000$_2$ in rack 2 via leaf 3 and leaf 4 switches. Eight of the paths are disjoint, such as two source servers sharing the same leaf switches to a same destination node do not share a same spine switch to a destination. In the example, there are eight disjoint paths between two servers on different racks but an outgoing link from a spine to a leaf switch may be shared by all incoming links to the spine and might be congested in many-to-many or many-to-one communications.

For example, the overlay agent on source server 1004$_S$, based on the loads on the ports on source leaf 1 and source leaf 2, and the port statistics from leaf 1 and leaf 2, may select path [L2.P2, L3.P2] via leaf 2 and send the path setup message with source leaf (switch) port statistics vector [L2.P1:3, L2.P2:1, L2.P3:4, L2.P4:2] to the destination server 1004$_D$, where Li:Pj:n is such that for leaf Li and port Pj on leaf Li, the queue depth or transmission rate is the number n, expressing a load. When the path setup message arrives at the destination server 1004$_D$ from leaf 3, the overlay agent on the destination server 1004$_D$ evaluates its path preferences based on the loads on the leaf 3 and leaf 4 ports indicated in destination leaf port statistics vector from leaf 3 and leaf 4 as well as the source leaf port statistics vector from the source server 1004$_S$ from leaf 1 and leaf 2. The overlay agent of the destination server 1004$_D$ selects a path via leaf 4 assuming the link to destination leaf 4 is less utilized compared to the link to destination leaf 3. By combining the local destination port statistics vector— [L4.P1:2, L4.P2:2, L4.P3:2, L4.P4:3] and the local source port statistics vector—[L2.P1:3, L2.P2:1, L2.P3:4, L2.P4:2], the destination server 1004$_D$ selects path [L2.P2, L4.P2] for the flow, which is the end-to-end least-utilized path for the flow based on the current congestions on both ends.

Figure 11:
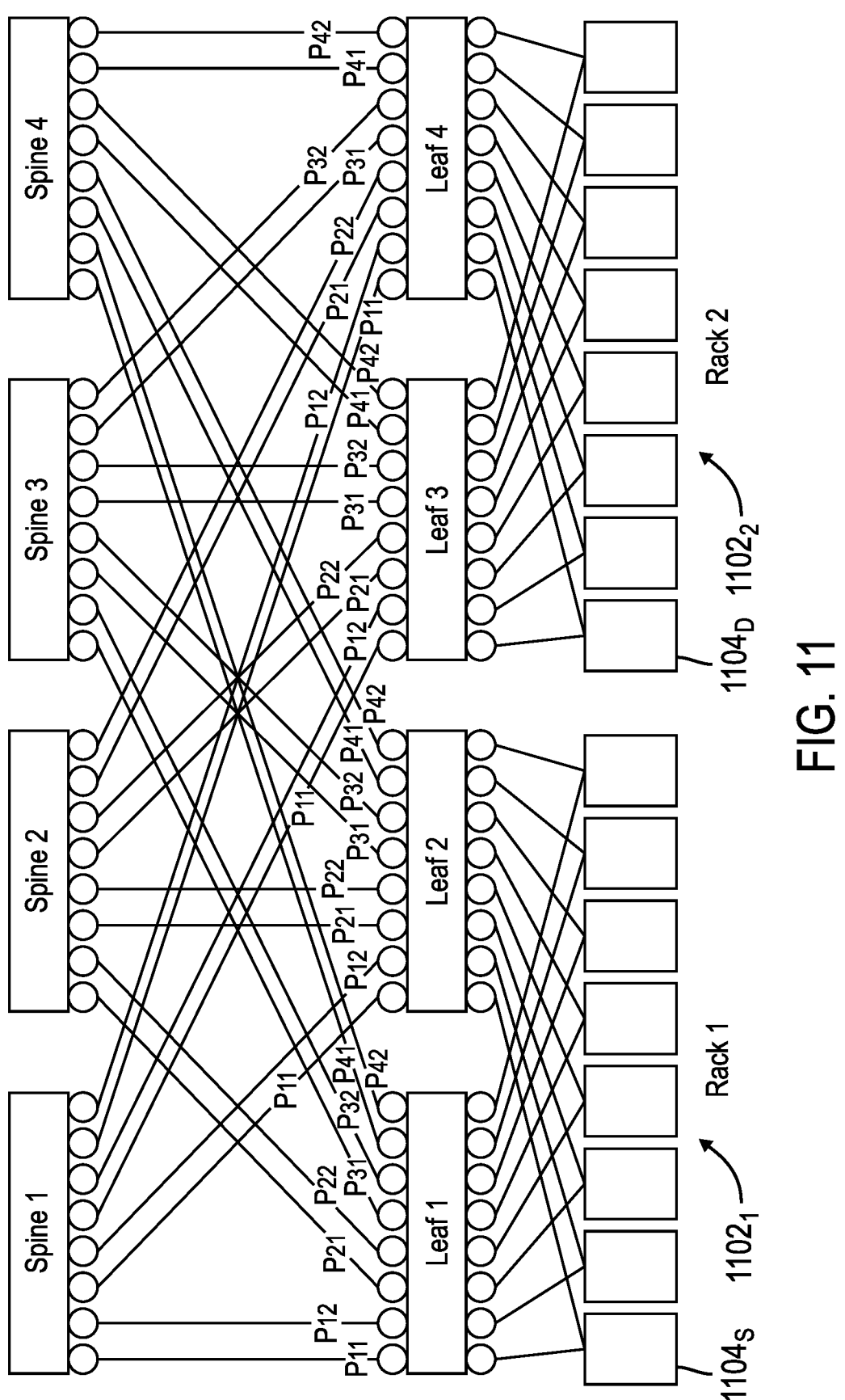
FIG. 11 illustrates an embodiment of a network with parallel links and dual-homed servers in which described embodiments may be implemented.

FIG. 11 illustrates a network 1100 with parallel links between each leaf and spine switch pairs and dual-homed server sets 1102$_1$ and 1102$_2$ to increase inter-rack bandwidth to minimize network congestion. In FIG. 11, there are eight disjoint paths between every pair of leaf switches and with dual homing there are sixteen disjoint paths in the network 1100 between every pair of servers 1102$_1$ and 1102$_2$ on different racks. In the embodiment of FIG. 11, the underlay agent may install only disjoint paths to servers on the leaf switches, which are identified by unique path IDs. By way of example, the source server 1104$_S$ on rack 1 is sending traffic to the destination server 1104$_D$ on rack 2. When the first packet of the flow arrives at the overlay agent on the source server 1104$_S$, the source overlay agent 308$_S$ queries the underlay agent 302$_S$ for paths to the destination server 1104$_D$. The underlay agent 302$_S$ may return sixteen paths along with their current utilization estimates, eight of them via leaf 1 and eight of them via leaf 2. The source overlay agent 308$_S$ will first select the locally least-utilized path from the source to the destination for the flow by installing a flow rule on the source server 1104$_S$ network adapter and sends the path setup message for the flow including the source local leaf switch port statistics.

The source overlay agent 308$_S$ first selects one of the source leaf switches based on the link utilizations between the server and the source leaf switches, and then selects one of the eight disjoint paths through that leaf switch. The source overlay agent 308$_S$ may select path [L1.P31, L3.P31] via leaf 1 for the flow and sends the path setup message with the source leaf port statistics vector for leaf 1, [L1.P11:2, L1.P12:3, L1.P21:1, L1.P22:4, L1.P31:0, L1.P32:2, L1.P41: 3, L1.P42:2]. When the destination overlay agent 308$_D$ on the destination server 1104$_D$ receives the path setup message for the flow, the destination overlay agent 308$_D$ may query the destination underlay agent 302$_D$ for all available paths along with their leaf port statistics for this flow and receives sixteen paths, eight of them via leaf 3 and eight of them via leaf 4. The destination overlay agent 308$_D$ first selects one of the leaf switches 3 and 4 based on the link utilization between the destination node and the destination leaf switches. In the event the destination overlay agent 308$_D$ selects leaf 4 and the leaf 4 port statistics vector, by combining the source switch port statistics vector, [L1.P11: 2, L1.P12:3, L1.P21:1, L1.P22:4, L1.P31:0, L1.P32:2, L1.P41:3, L1.P42:2], with the destination leaf port statistics vector, [L4.P11:3, L4.P12:3, L4.P21:2, L4.P22:0, L4.P31:3, L4.P32:2, L4.P41:2, L4.P42:5], the destination overlay agent 308$_D$ selects the end-to-end least-utilized path [L1.P21, L4.P21] and sends an acknowledgement for the path selection to the source server 1104$_S$. In further embodiments, overlapping fabric paths may be used to further improve the path selection at the expense of installing more paths on the leaf switches and with greater computation at the destination server $1104_D$.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1200 contains an example of an environment for the execution of at least some of the computer code involved in performing the inventive methods, such as the underlay agent 302 and the overlay agent 308. In addition to components 302 and 308, computing environment 1200 includes, for example, computer 1201, wide area network (WAN) 1202, end user device (EUD) 1203, remote server 1204, public cloud 1205, and private cloud 1206. In this embodiment, computer 1201 includes processor set 1210 (including processing circuitry 1220 and cache 1221), communication fabric 1211, volatile memory 1212, persistent storage 1213 (including operating system 1222 and blocks 302 and 308, as identified and described with respect to FIG. 3 above), peripheral device set 1214 (including user interface (UI) device set 1223, storage 1224, and Internet of Things (IoT) sensor set 1225), and network module 1215. Remote server 1204 includes remote database 1230. Public cloud 1205 includes gateway 1240, cloud orchestration module 1241, host physical machine set 1242, virtual machine set 1243, and container set 1244.

COMPUTER 1201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1230. As is well understood in the art of computer technology, and depending upon the technology, performance of a computer-implemented method may be distributed among multiple computers and/or between multiple locations. On the other hand, in this presentation of computing environment 1200, detailed discussion is focused on a single computer, specifically computer 1201, to keep the presentation as simple as possible. Computer 1201 may be located in a cloud, even though it is not shown in a cloud in FIG. 12. On the other hand, computer 1201 is not required to be in a cloud except to any extent as may be affirmatively indicated.

PROCESSOR SET 1210 includes one, or more, computer processors of any type now known or to be developed in the future. Processing circuitry 1220 may be distributed over multiple packages, for example, multiple, coordinated integrated circuit chips. Processing circuitry 1220 may implement multiple processor threads and/or multiple processor cores. Cache 1221 is memory that is located in the processor chip package(s) and is typically used for data or code that should be available for rapid access by the threads or cores running on processor set 1210. Cache memories are typically organized into multiple levels depending upon relative proximity to the processing circuitry. Alternatively, some, or all, of the cache for the processor set may be located "off chip." In some computing environments, processor set 1210 may be designed for working with qubits and performing quantum computing.

Computer readable program instructions are typically loaded onto computer 1201 to cause a series of operational steps to be performed by processor set 1210 of computer 1201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1221 and the other storage media discussed below. The program instructions, and associated data, are accessed by processor set 1210 to control and direct performance of the inventive methods. In computing environment 1200, at least some of the instructions for performing the inventive methods may be stored in blocks 302 and 308 *in* persistent storage 1213.

COMMUNICATION FABRIC 1211 is the signal conduction path that allows the various components of computer 1201 to communicate with each other. Typically, this fabric is made of switches and electrically conductive paths, such as the switches and electrically conductive paths that make up buses, bridges, physical input/output ports and the like.

Other types of signal communication paths may be used, such as fiber optic communication paths and/or wireless communication paths.

VOLATILE MEMORY 1212 is any type of volatile memory now known or to be developed in the future. Examples include dynamic type random access memory (RAM) or static type RAM. Typically, volatile memory 1212 is characterized by random access, but this is not required unless affirmatively indicated. In computer 1201, the volatile memory 1212 is located in a single package and is internal to computer 1201, but, alternatively or additionally, the volatile memory may be distributed over multiple packages and/or located externally with respect to computer 1201.

PERSISTENT STORAGE 1213 is any form of non-volatile storage for computers that is now known or to be developed in the future. The non-volatility of this storage means that the stored data is maintained regardless of whether power is being supplied to computer 1201 and/or directly to persistent storage 1213. Persistent storage 1213 may be a read only memory (ROM), but typically at least a portion of the persistent storage allows writing of data, deletion of data and re-writing of data. Some familiar forms of persistent storage include magnetic disks and solid state storage devices. Operating system 1222 may take several forms, such as various known proprietary operating systems or open source Portable Operating System Interface-type operating systems that employ a kernel. The code included in blocks 302 and 308 typically includes at least some of the computer code involved in performing the inventive methods.

PERIPHERAL DEVICE SET 1214 includes the set of peripheral devices of computer 1201. Data communication connections between the peripheral devices and the other components of computer 1201 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1223 may include components such as a display screen, speaker, microphone, wearable devices (such as goggles and smart watches), keyboard, mouse, printer, touchpad, game controllers, and haptic devices. Storage 1224 is external storage, such as an external hard drive, or insertable storage, such as an SD card. Storage 1224 may be persistent and/or volatile. In some embodiments, storage 1224 may take the form of a quantum computing storage device for storing data in the form of qubits. In embodiments where computer 1201 is required to have a large amount of storage (for example, where computer 1201 locally stores and manages a large database) then this storage may be provided by peripheral storage devices designed for storing very large amounts of data, such as a storage area network (SAN) that is shared by multiple, geographically distributed computers. IoT sensor set 1225 is made up of sensors that can be used in Internet of Things applications. For example, one sensor may be a thermometer and another sensor may be a motion detector.

NETWORK MODULE 115 is the collection of computer software, hardware, and firmware that allows computer 1201 to communicate with other computers through WAN 1202. Network module 1215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1215 are performed on the same physical hardware device. In other embodiments (for example, embodiments that utilize software-defined networking (SDN)), the control functions and the forwarding functions of network module 1215 are performed on physically separate devices, such that the control functions manage several different network hardware devices. Computer readable program instructions for performing the inventive methods can typically be downloaded to computer 1201 from an external computer or external storage device through a network adapter card or network interface included in network module 1215.

WAN 1202 is any wide area network (for example, the internet) capable of communicating computer data over non-local distances by any technology for communicating computer data, now known or to be developed in the future. In some embodiments, the WAN 1202 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1203 is any computer system that is used and controlled by an end user (for example, a customer of an enterprise that operates computer 1201), and may take any of the forms discussed above in connection with computer 1201. EUD 1203 typically receives helpful and useful data from the operations of computer 1201. For example, in a hypothetical case where computer 1201 is designed to provide a recommendation to an end user, this recommendation would typically be communicated from network module 1215 of computer 1201 through WAN 1202 to EUD 1203. In this way, EUD 1203 can display, or otherwise present, the recommendation to an end user. In some embodiments, EUD 1203 may be a client device, such as thin client, heavy client, mainframe computer, desktop computer and so on.

REMOTE SERVER 1204 is any computer system that serves at least some data and/or functionality to computer 1201, such as a destination node 300$_D$. Remote server 1204 may be controlled and used by the same entity that operates computer 1201. Remote server 1204 represents the machine(s) that collect and store helpful and useful data for use by other computers, such as computer 1201. For example, in a hypothetical case where computer 1201 is designed and programmed to provide a recommendation based on historical data, then this historical data may be provided to computer 1201 from remote database 1230 of remote server 1204.

PUBLIC CLOUD 1205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1205 is performed by the computer hardware and/or software of cloud orchestration module 1241. The computing resources provided by public cloud 1205 are typically implemented by virtual computing environments that run on various computers making up the computers of host physical machine set 1242, which is the universe of physical computers in and/or available to public cloud 1205. The virtual computing environments (VCEs) typically take the form of virtual machines from virtual machine set 1243 and/or containers from container set 1244. It is understood that these VCEs may be stored as images and may be transferred among and between the various physical machine hosts, either as images or after instantiation of the VCE. Cloud orchestration module 1241 manages the transfer and storage of images, deploys new instantiations of VCEs and manages active instantiations of VCE deployments. Gateway 1240 is the collection of computer software, hardware, and firmware that allows public cloud 1205 to communicate through WAN 1202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1206 is similar to public cloud 1205, except that the computing resources are only available for use by a single enterprise. While private cloud 1206 is depicted as being in communication with WAN 1202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1205 and private cloud 1206 are both part of a larger hybrid cloud.

The letter designators, such as i, j is used to designate a number of instances of an element may indicate a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for selecting a path to use to communicate from a source node to a destination node in a network, the computer program product comprising a computer readable storage medium having computer readable program code embodied therein that when executed at the source node and the destination node performs operations, the operations comprising:

selecting, by the source node, a first path to a destination node based on source switch port utilization information for ports in a local source switch to which the source node connects;

transmitting, by the source node, a path setup message to the destination node over the selected first path comprising information on the selected first path and source switch port utilization information;

determining, by the destination node, a second path from the source node to the destination node including a selected local source switch port and a local destination switch port based on the source switch port utilization information in the path setup message and destination switch port utilization information of ports in a local destination switch to which the destination node connects;

transmitting to the source node, by the destination node, a reply to the path setup message comprising information on the second path, including the selected local source switch port and the local destination switch port of the second path; and using, by the source node, the second path indicated in the reply to the path setup message to communicate with the destination node.

2. The computer program product of claim 1, wherein the determining the second path comprises determining a local source switch port and a local destination switch port that is a least utilized path, wherein a path utilization for a local source switch port and local destination switch port pair comprises a maximum of utilizations of the local source switch port and the local destination switch port indicated in the source switch port utilization information and the destination switch port utilization information, respectively.

3. The computer program product of claim 1, wherein the operations further comprise:

receiving, at the source node and the destination node, path identifiers of paths between nodes in the network, wherein the local source switch maintains a mapping of path identifiers to identifiers of links between components in the paths identified by the path identifiers, wherein the path setup message indicates a first path identifier of the first path of the received path identifiers, wherein the local source switch replaces the first path identifier with identifiers of links between the source node and the destination node to use to direct the path setup message to the destination node.

4. The computer program product of claim 1, wherein the source switch port utilization information comprises transmission rates and transmission queue lengths for ports on the local source switch, and wherein the destination switch port utilization information comprises reception rates on ports on the local destination switch.

5. The computer program product of claim 1, wherein the operations further comprise:

determining, by the source node, whether the first path and the second path comprise different paths, wherein the using, by the source node, one of the first path and the second path comprises:

using the first path in response to determining that the first path and the second path match; and using the second path in response to determining that the first path and the second path do not match.

6. The computer program product of claim 1, wherein the operations further comprise:

configuring, by the source node, a flow rule in a source node network adapter to indicate the first path to use to communicate packets to the destination node, wherein the flow rule is used to transmit the path setup message; and modifying, by the source node, the flow rule to indicate the second path to use to communicate packets to the destination node in response to the second path being different from the first path.

7. The computer program product of claim 1, wherein the operations further comprise:

receiving, by a source underlay agent at the source node, information on available paths between nodes in the network, including paths between the source node and the destination node from a network manager providing the information to the nodes in the network;

querying, by the source underlay agent, the local source switch for the source switch port utilization information based on current statistics gathered for the ports in the local source switch;

querying, by a source overlay agent at the source node, the source underlay agent for available paths to the destination node and the source switch port utilization information in response to receiving a first packet of a flow at the source node; and returning, by the source underlay agent, available paths from the source node to the destination node from the information on available paths and the source switch port utilization information to the source overlay agent, wherein the source overlay agent selects the first path based on the source switch port utilization information.

8. The computer program product of claim 1, wherein the operations further comprise:

receiving, by a destination underlay agent at the destination node, information on available paths between nodes in the network, including paths between the source node and the destination node from a network manager providing the information on available paths to the nodes in the network;

querying, by the destination underlay agent, the local destination switch for the destination switch port utilization information based on current statistics gathered for the ports in the local destination switch;

querying, by a destination overlay agent at the destination node, the destination underlay agent for available paths to the source node and the destination switch port utilization information in response to receiving the path setup message; and returning, by the destination underlay agent, available paths from the source node to the destination node from the information on available paths and the destination switch port utilization information to the destination overlay agent, wherein the destination overlay agent determines the second path from the source node to the destination node and transmits the reply to the path setup message.

9. A system for selecting a path to use to communicate from a source node to a destination node in a network, comprising:

a source node;

a destination node;

a computer readable storage medium having computer readable program code embodied therein that when executed by the source node and the destination node performs operations, the operations comprising:

selecting, by the source node, a first path to a destination node based on source switch port utilization information for ports in a local source switch to which the source node connects;

transmitting, by the source node, a path setup message to the destination node over the selected first path comprising information on the selected first path and source switch port utilization information;

determining, by the destination node, a second path from the source node to the destination node including a selected local source switch port and a local destination switch port based on the source switch port utilization information in the path setup message and destination switch port utilization information of ports in a local destination switch to which the destination node connects;

transmitting to the source node, by the destination node, a reply to the path setup message comprising information on the second path, including the selected local source switch port and the local destination switch port of the second path; and using, by the source node, the second path indicated in the reply to the path setup message to communicate with the destination node.

10. The system of claim 9, wherein the determining the second path comprises determining a local source switch port and a local destination switch port that is a least utilized path, wherein a path utilization for a local source switch port and local destination switch port pair comprises a maximum of utilizations of the local source switch port and the local destination switch port indicated in the source switch port utilization information and the destination switch port utilization information, respectively.

11. The system of claim 9, wherein the source switch port utilization information comprises transmission rates and transmission queue lengths for ports on the local source switch, and wherein the destination switch port utilization information comprises reception rates on ports on the local destination switch.

12. The system of claim 9, wherein the operations further comprise:

determining, by the source node, whether the first path and the second path comprise different paths, wherein the using, by the source node, one of the first path and the second path comprises:

using the first path in response to determining that the first path and the second path match; and using the second path in response to determining that the first path and the second path do not match.

13. The system of claim 9, wherein the operations further comprise:

receiving, by a source underlay agent at the source node, information on available paths between nodes in the network, including paths between the source node and the destination node from a network manager providing the information to the nodes in the network;

querying, by the source underlay agent, the local source switch for the source switch port utilization information based on current statistics gathered for the ports in the local source switch;

querying, by a source overlay agent at the source node, the source underlay agent for available paths to the destination node and the source switch port utilization information in response to receiving a first packet of a flow at the source node; and returning, by the source underlay agent, available paths from the source node to the destination node from the information on available paths and the source switch port utilization information to the source overlay agent, wherein the source overlay agent selects the first path based on the source switch port utilization information.

14. The system of claim 9, wherein the operations further comprise:

receiving, by a destination underlay agent at the destination node, information on available paths between nodes in the network, including paths between the source node and the destination node from a network manager providing the information on available paths to the nodes in the network;

querying, by the destination underlay agent, the local destination switch for the destination switch port utilization information based on current statistics gathered for the ports in the local destination switch;

querying, by a destination overlay agent at the destination node, the destination underlay agent for available paths to the source node and the destination switch port utilization information in response to receiving the path setup message; and returning, by the destination underlay agent, available paths from the source node to the destination node from the information on available paths and the destination switch port utilization information to the destination overlay agent, wherein the destination overlay agent determines the second path from the source node to the destination node and transmits the reply to the path setup message.

15. A method for selecting a path to use to communicate from a source node to a destination node in a network, comprising:

selecting, by the source node, a first path to a destination node based on source switch port utilization information for ports in a local source switch to which the source node connects;

transmitting, by the source node, a path setup message to the destination node over the selected first path comprising information on the selected first path and source switch port utilization information;

determining, by the destination node, a second path from the source node to the destination node including a selected local source switch port and a local destination switch port based on the source switch port utilization information in the path setup message and destination switch port utilization information of ports in a local destination switch to which the destination node connects;

transmitting to the source node, by the destination node, a reply to the path setup message comprising information on the second path, including the selected local source switch port and the local destination switch port of the second path; and using, by the source node, the second path indicated in the reply to the path setup message to communicate with the destination node.

16. The method of claim 15, wherein the determining the second path comprises determining a local source switch port and a local destination switch port that is a least utilized path, wherein a path utilization for a local source switch port and local destination switch port pair comprises a maximum of utilizations of the local source switch port and the local destination switch port indicated in the source switch port utilization information and the destination switch port utilization information, respectively.

17. The method of claim 15, wherein the source switch port utilization information comprises transmission rates and transmission queue lengths for ports on the local source switch, and wherein the destination switch port utilization information comprises reception rates on ports on the local destination switch.

18. The method of claim 15, further comprising:

determining, by the source node, whether the first path and the second path comprise different paths, wherein the using, by the source node, one of the first path and the second path comprises:

using the first path in response to determining that the first path and the second path match; and using the second path in response to determining that the first path and the second path do not match.

19. The method of claim 15, further comprising:

receiving, by a source underlay agent at the source node, information on available paths between nodes in the network, including paths between the source node and the destination node from a network manager providing the information to the nodes in the network;

querying, by the source underlay agent, the local source switch for the source switch port utilization information based on current statistics gathered for the ports in the local source switch;

querying, by a source overlay agent at the source node, the source underlay agent for available paths to the destination node and the source switch port utilization information in response to receiving a first packet of a flow at the source node; and returning, by the source underlay agent, available paths from the source node to the destination node from the information on available paths and the source switch port utilization information to the source overlay agent, wherein the source overlay agent selects the first path based on the source switch port utilization information.

20. The method of claim 15, further comprising:

receiving, by a destination underlay agent at the destination node, information on available paths between nodes in the network, including paths between the source node and the destination node from a network manager providing the information on available paths to the nodes in the network;

querying, by the destination underlay agent, the local destination switch for the destination switch port utilization information based on current statistics gathered for the ports in the local destination switch;

querying, by a destination overlay agent at the destination node, the destination underlay agent for available paths to the source node and the destination switch port utilization information in response to receiving the path setup message; and returning, by the destination underlay agent, available paths from the source node to the destination node from the information on available paths and the destination switch port utilization information to the destination overlay agent, wherein the destination overlay agent determines the second path from the source node to the destination node and transmits the reply to the path setup message.

* * * * *